April 19, 1927.

R. J. O. SIMPSON

MICROMETER CALIPERS

Filed Oct. 15, 1923

Inventor
Robert J.O.Simpson
By Ellis Spear Jr.
Attorney

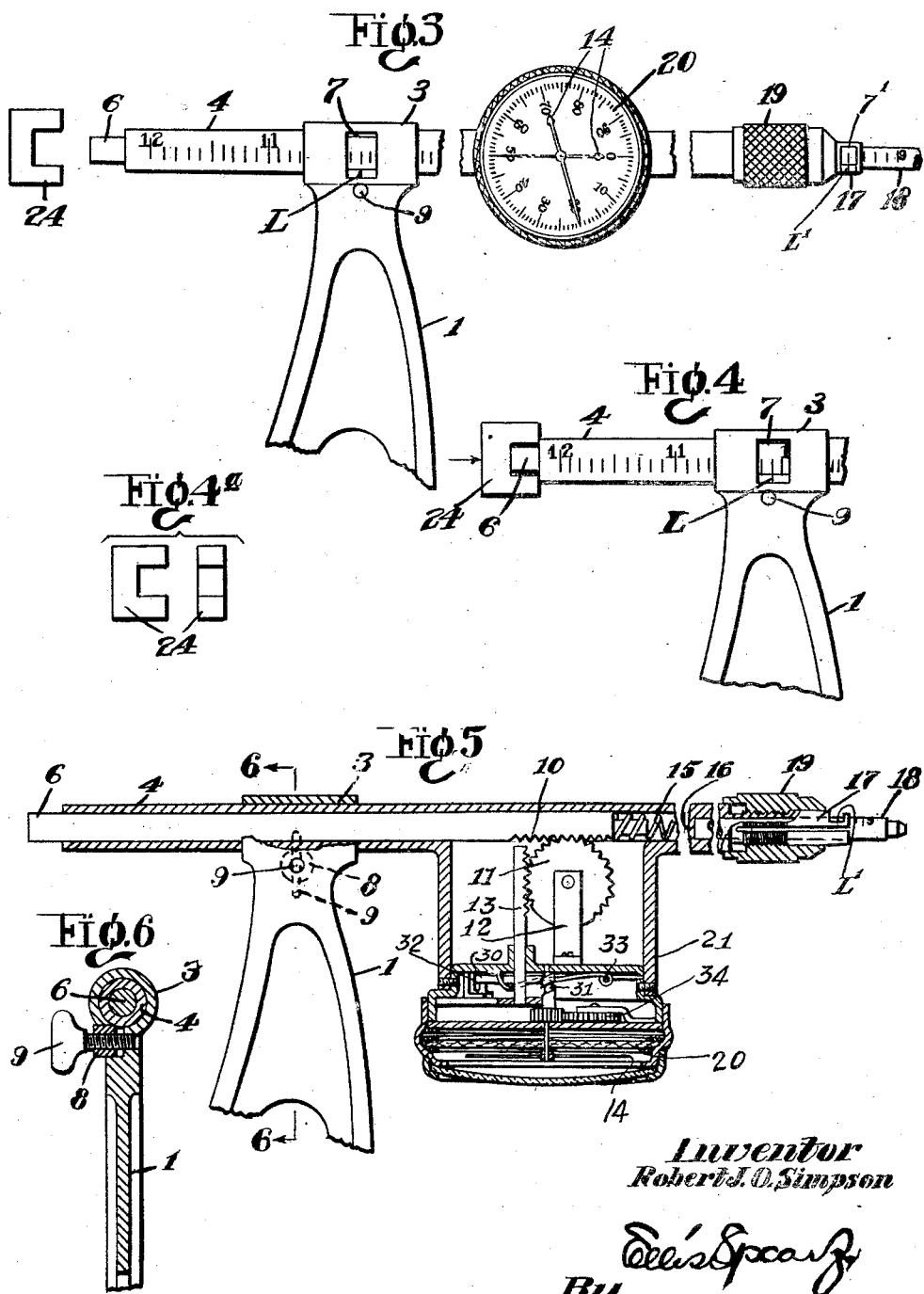

Patented Apr. 19, 1927.

1,625,767

UNITED STATES PATENT OFFICE.

ROBERT J. O. SIMPSON, OF ATHOL, MASSACHUSETTS, ASSIGNOR TO THE L. S. STARRETT COMPANY, OF ATHOL, MASSACHUSETTS, A CORPORATION OF MASSACHUSETTS.

MICROMETER CALIPERS.

Application filed October 15, 1923. Serial No. 668,583.

This invention relates to micrometer calipers, and particularly to a dial indicator attachment for an outside micrometer calipers frame.

My invention involves certain improvements upon and refinements over the dial indicator attachment of my prior application, Serial No. 583,160, filed August 21, 1922, to which reference is made.

According to my present invention, the dial indicator attachment is constructed and arranged to permit both inside and outside calipering and, moreover, can be readily detached from the calipers frame and used as an ordinary dial gage.

The construction and manner of using my attachment, together with a selected embodiment which well illustrates the principles involved, is described and shown in the accompanying specification and drawings, and the characteristic features of novelty are particularly pointed out in the appended claims. Throughout the specification and drawings like reference characters are employed to indicate corresponding parts, and in the drawings:

Fig. 3 is a detail view particularly illustrating an arrangement for checking up the initial setting of the dial gage.

Figure 1:
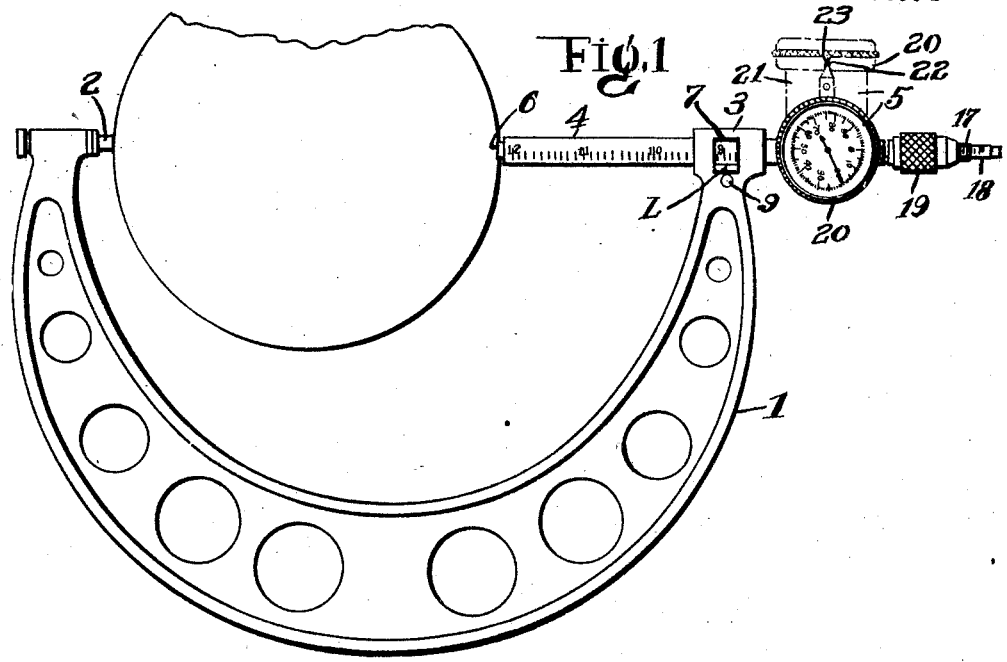
Fig. 1 is a side elevation of an outside micrometer calipers frame of standard type equipped with my invention and illustrating the manner of use thereof in making an outside measurement.

Figs. 4 and 4ª further illustrate such checking up action.

Fig. 5 is a partial longitudinal section through the attachment, and

Fig. 6 is a cross section on the line 6—6, of Fig. 5.

I have indicated at 1 the frame of an outside micrometer calipers of standard type, at 2 the anvil thereof, and at 3 the spindle bearing. Preferably the anvil is detachably mounted in the frame so that it may be removed and anvils of different lengths substituted therefor to vary the capacity of the calipers.

Rotatably and slidably mounted in the spindle bearing 3 is a sleeve 4 which carries beyond the frame 1 a dial indicator 5 of standard type. Slidable within the sleeve 4 is a contact stem 6, the outer end of which normally projects slightly beyond the adjacent end of the sleeve, for contact with the object to be calipered. The sleeve itself is externally graduated, preferably in tenths of an inch, and said graduations are readable with reference to some stationary mark, as the reading line L cut on the spindle bearing 3, said bearing itself being apertured as indicated at 7 to expose the graduations of said sleeve.

By rotating the sleeve in the bearing as indicated in full and dotted lines, Fig. 1, the dial may be positioned at any convenient angle so that the reading registered on the dial may be observed conveniently at all times and under all conditions of use regardless of the position in which the calipers is held or the user himself occupies. By adjusting the sleeve longitudinally in said bearing the capacity of the device may be varied as desired within the limits of the sleeve itself. Preferably both the rotative and the longitudinal adjustments of the sleeve are held by the same clamp. As here shown, such clamp consists of a clamping piece 8 mounted on a thumb bolt 9 set transversely through the frame 1 just below the bearing 3, said bearing being partially cut away to expose the sleeve 4 for engagement by said clamping piece when the bolt is turned in the proper direction.

At its inner end, the contact stem 6 is provided with a series of rack teeth 10 meshing with a gear segment 11 mounted in a split bearing 12 depending from the under face of the dial casing 21. The gear segment 11 meshes with a vertical rack bar 13 reciprocable within the dial casing and the rack bar 13 is operatively connected with the pointer 14 of the dial indicator by any suitable motion transmitting connections whereby to transmit the reciprocatory movement of the stem 6 to the pointer 14 as rotary motion. As here shown, (see Fig. 5) the motion-transmitting connections comprise a transverse pin 30 carried by the vertical rack bar 13. One end of said pin is disposed in a spiral groove cut in the pointer barrel 31. The opposite end of said pin is guided in a slotted guide 32 fulcrumed on the casing 21 of the dial indicator. The movement of the rack bar 13 towards the dial is resisted by a coil spring 33 anchored within said casing and engaging the pin 30 at one end. The rotation of the pointer barrel 31 is transmitted to the pointer 14 through a reducing gear train 34. The inward movement of said stem is opposed by a coil spring 15 which is interposed between said stem and a plug 16 fixed within the opposite end of the sleeve 4 and said spring returns the stem 6 to its normal exposed position, shown in Figs. 3 and 5, after each actuation.

Figure 2:
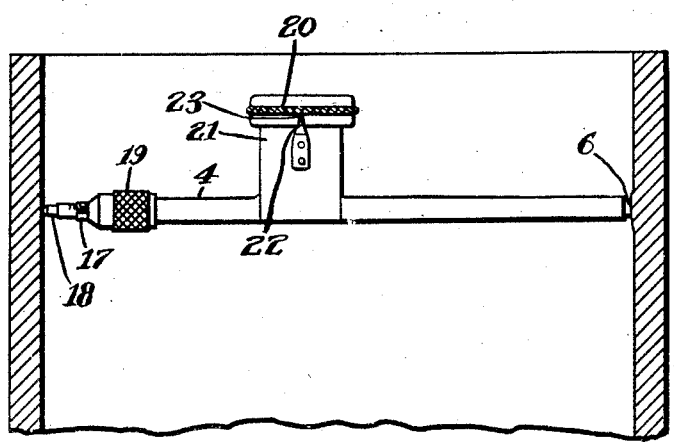
Fig. 2 is a detailed view illustrating the manner of use of my attachment when making an inside measurement.

As contemplated herein, the plug 16 constitutes a mounting for a split chuck 17 within which may be adjustably clamped an externally graduated stationary contact stem 18. The graduations of said stem are readable with reference to a fixed reading line L' on the nose of the chuck, said chuck now being cut away as indicated at 7' to expose said graduations. The stationary stem 18 may be furnished in different lengths whereby to vary the capacity of the device, and the chuck 17 is opened and closed by means of the usual chuck operating nut 19. This construction adapts the device for use as an inside micrometer as shown in Fig. 2, and also permits the device to be used as an ordinary dial gage when removed wholly from the frame 1.

The dial 20 of the indicator is rotatably mounted upon the dial indicator casing 21 which latter is preferably made solid with the sleeve 4. In order to prevent the dial from being accidentally rotated relative to the casing, I provide a snap catch 22 fixed to the casing 21 and adapted to snap into a depression 23 formed in the rotatable dial. The arrangement is such that when the dial is rotated to bring the zero graduation of the dial under the pointer 14, the catch 22 will snap into the locking depression 23, thus holding the dial against further rotation until said catch shall have been released. With the catch 22 disposed in the depression 23, therefore, the dial is locked at the position in its orbit of rotation wherein the pointer 14 and zero graduation of the dial register with each other.

Preferably the dial is graduated in hundredths of an inch so as to give a reading in thousandths. As here shown, the dial indicator has a capacity of slightly more than two hundred thousandths in one setting; that is to say, the contact stem 6 when driven inwardly to its limit of travel will carry the pointer through two complete revolutions over the dial and through a determined portion of another revolution, hereinafter referred to as the come and go or tolerance limit of the indicator, until the pointer rests exactly at zero on the dial. This tolerance limit may be about twenty one hundredths (as indicated by the full line position of pointer in Fig. 3) and simply represents the come and go one way or the other of the pointer swing. This allowance for come and go indicates to the mechanic when turning down a piece of work to a definite diameter, for example, that he is approaching the exact diameter which he wants, in much the same manner that the swing of the pointer back and forth in a scale indicates to one using the scale that he is approaching the desired weight. By adjusting the sleeve 4 longitudinally in the bearing 3 relative to the fixed measuring line L additional hundredths of an inch can be added in case the two hundredths allowed by the dial is insufficient.

In order to provide an additional check to insure that the initial setting of the dial at zero is correct, the check piece shown in Figs. 3, 4 and 4ᵃ may be used. This is simply a U-shaped piece 24 adapted to fit over the exposed end of the contact stem 6. The slot thereof is deep enough to permit the legs of the check piece to abut the sleeve 4 when the check piece is applied to the stem and the stem driven home. If the catch 22 is engaged in the locking depression 23 at such time, the check piece, when applied, will carry the pointer of the dial from the full line position of Fig. 3 to the zero graduation of the dial, as shown in dotted lines in said figure.

With the parts thus set and tested, the mechanic brings the stem 6 and the anvil 2 in outside calipering, against the work (Fig. 1) and by observing the position of the pointer on the dial can tell at a glance whether or not the work is within the desired diameter.

In using the attachment for inside work, as indicated in Fig. 2, the movable contact stem 6 and stationary contact stem 18 are brought against the inner face of the cylinder or other wall and the reading observed on the dial.

Various modifications in the form and construction of my device may obviously be resorted to without departing from the spirit of my invention if within the limits of the appended claims.

What I therefore claim and desire to secure by Letters Patent is:

1. In combination with the frame of an outside micrometer calipers, said frame having a bearing and said bearing having a sight opening therethrough and a reading line adjacent said opening, a graduated sleeve mounted in said bearing, a dial indicator casing carried by said sleeve, a dial and a pointer mounted upon said casing, a contact stem slidable within one end of said sleeve, a plug fixed in the opposite end of said sleeve, a chuck mounted on said plug and having a sight opening and a reading line adjacent said opening, a graduated relatively stationary contact stem fixed in said chuck and alined with said relatively movable contact stem, and motion transmitting connections between said relatively movable contact stem and said pointer.

2. In combination with the frame of an outside micrometer calipers, said frame having a bearing, and said bearing having a sight opening therethrough and a reading line adjacent said opening, a graduated sleeve mounted in said bearing, a dial indicator casing carried by said sleeve, a rotatable dial and a pointer mounted upon said casing, a contact stem slidable within one end of said sleeve, interengageable means for locking the dial against rotation relative to said casing, a graduated relatively stationary contact stem fixed in the opposite end of said sleeve and alined with said relatively movable contact stem, and motion transmitting connections between said relatively movable contact stem and said pointer.

3. In combination with the frame of an outside micrometer calipers, a graduated sleeve mounted in said frame, a dial indicator casing carried by said sleeve, a contact stem slidable within one end of said sleeve, a dial and a pointer rotatably mounted on said casing, a snap catch and a locking depression mutually interengageable to lock the dial against rotation relative to said casing, a graduated relatively stationary contact stem fixed in the opposite end of said sleeve and alined with said relatively movable contact stem, and motion transmitting connections between said relatively movable contact stem and said pointer.

4. In a dial indicator comprising a sleeve, a casing mounted on said sleeve, a pointer and a dial rotatably mounted on said casing, a contact stem slidable in said sleeve, motion transmitting connections between said stem and said pointer, and interengageable means for locking the dial against rotation relative to said casing.

5. In combination with the frame of an outside micrometer calipers, said frame having a bearing and said bearing having a sight opening therethrough and a reading line adjacent said opening, a graduated sleeve mounted in said bearing, a dial indicator casing carried by said sleeve, a dial and a pointer mounted upon said casing, a contact stem slidable within one end of said sleeve, a relatively stationary member alined with said contact stem, and motion-transmitting connections between said relatively movable contact stem and said pointer.

6. In combination with a frame of an outside micrometer calipers, said frame having a bearing, a sleeve mounted in said bearing, a dial indicator casing carried by said sleeve, a dial and a pointer mounted upon said casing, a contact stem slidable within one end of said sleeve, a plug fixed in the opposite end of said sleeve, a chuck mounted on said plug and having a sight opening and a reading line adjacent said opening, a graduated, relatively stationary contact stem carried by said chuck and alined with said relatively movable contact stem, and motion transmitting connections between said relatively movable contact stem and said pointer.

7. In combination with the frame of an outside micrometer calipers, said frame having a bearing, a sleeve mounted in said bearing, a dial indicator casing carried by said sleeve, a dial and a pointer mounted upon said casing, a contact stem slidable within one end of said sleeve, a plug fixed in the opposite end of said sleeve, a chuck mounted on said plug, a relatively stationary contact stem carried by said chuck and alined with said relatively movable contact stem, and motion transmitting connections between said relatively movable contact stem and said pointer.

In testimony whereof I affix my signature.

ROBERT J. O. SIMPSON.